United States Patent [19]

Nagase et al.

[11] Patent Number: 4,817,003
[45] Date of Patent: Mar. 28, 1989

[54] APPARATUS FOR DETECTING AND INDICATING THE BALANCE OF A ROTARY BODY IN A MACHINE TOOL

[75] Inventors: Noboru Nagase; Masao Yamaguchi; Noritake Noguchi, all of Gifu, Japan

[73] Assignee: Nagase Iron Works Co., Ltd., Gifu, Japan

[21] Appl. No.: 136,516

[22] Filed: Dec. 22, 1987

Related U.S. Application Data

[63] Continuation of Ser. No. 778,577, Sep. 20, 1985, abandoned.

[30] Foreign Application Priority Data

| Oct. 9, 1984 | [JP] | Japan | 59-212157 |
| Nov. 30, 1984 | [JP] | Japan | 59-254796 |
| Dec. 11, 1984 | [JP] | Japan | 59-261265 |
| Dec. 11, 1984 | [JP] | Japan | 59-261267 |
| Feb. 19, 1985 | [JP] | Japan | 60-31267 |
| Feb. 19, 1985 | [JP] | Japan | 60-31268 |
| Feb. 19, 1985 | [JP] | Japan | 60-31269 |
| Jul. 4, 1985 | [JP] | Japan | 60-147290 |

[51] Int. Cl.$^4$ .................. G06F 15/20; G01M 1/16
[52] U.S. Cl. .................... 364/463; 364/508; 364/474.06; 73/462; 73/465
[58] Field of Search .............. 364/463, 508, 167, 474, 364/475; 73/462, 464, 465, 467, 660; 51/165.71, 165.74, 165.75

[56] References Cited

U.S. PATENT DOCUMENTS

| 3,811,327 | 5/1974 | Hack | 73/465 |
| 3,911,751 | 10/1975 | Shooter et al. | 73/464 |
| 4,027,245 | 5/1977 | Bourrat et al. | 364/474 |
| 4,155,255 | 5/1979 | Sherman et al. | 73/462 |
| 4,249,171 | 2/1981 | Batcher | 73/465 |
| 4,357,832 | 11/1982 | Blackburn et al. | 364/508 |
| 4,423,635 | 1/1984 | Senicourt et al. | 73/660 |
| 4,489,607 | 12/1984 | Park | 73/462 |
| 4,502,328 | 3/1985 | Wood et al. | 73/462 |
| 4,608,650 | 8/1986 | Kapadia | 364/508 |

FOREIGN PATENT DOCUMENTS

2833436 4/1979 Fed. Rep. of Germany .

Primary Examiner—John R. Lastova
Attorney, Agent, or Firm—Jordan and Hamburg

[57] ABSTRACT

The present invention relates to an apparatus for detecting and indicating the balance of a rotating body such as a grinding wheel, a spindle or the like in a machine tool such as a grinding machine. The apparatus comprises an original-point detecting means for detecting an original point on the rotating body, a vibration detecting means for detecting vibration caused by an unbalanced condition of the rotating body, an arithmetic means for computing, from the detected vibration, a deviation of said rotating body in each of a plurality of index positions on the rotating body which are angularly spaced from said original point as a reference, a deviation display means for displaying the maximum value of the deviations, and an unbalanced position indicating means for indicating one of the index positions based on the computed deviations.

13 Claims, 6 Drawing Sheets

APPARATUS FOR DETECTING AND INDICATING THE BALANCE OF A ROTARY BODY IN A MACHINE TOOL

This application is a continuation of application Ser. No. 778,577, filed Sept. 20, 1985, now abandoned.

BACKGROUND OF THE INVENTION

1. Field of the invention:

The present invention relates to an apparatus for detecting and indicating the balance of a rotating body such as a grinding wheel, a spindle or the like in a machine tool such as a grinding machine by detecting and indicating the amount of off-center deviation of the rotating body.

2. Description of the Prior Art:

Some machine tools employed for machining workpieces have spindles supporting rotating tools for machining the workpieces. Should the rotating tool attached to the spindle be unbalanced or the pulley and gears in the machine tool for driving the spindle be unbalanced, the spindle would be rotated eccentrically or out of trueness, and the workpiece would not be machined with trueness in its bore or on its outer periphery. Where the machine tool of this type is used for machining the workpiece with high accuracy, it is necessary to detect the amount of an off-center deviation of the spindle and correct it into proper balance. Especially in grinding machines, the rotating tool or grinding wheel is required to be properly balanced for accurate grinding operation.

For adjusting the rotational balancing of a grinding wheel, it has been customary to attach the grinding wheel to a single shaft placed over two horizontal bars, detect the direction and speed of rolling movement of the grinding wheel as it rolls of its own accord for determining the position and amount of eccentricity of the grinding wheel, and correct the grinding wheel to balance the same properly based on the determined off-center position and amount. However, such a balance correcting process relies on the worker's skill and hence is not sufficiently efficient. The conventional balance correcting process is not concerned with the correction of any unbalance of the shaft by which the grinding wheel is supported. Therefore, even when the grinding wheel is properly balanced, it will be rotated out of balance if attached to an unbalanced shaft.

SUMMARY OF THE INVENTION

It is an object of the present invention to provide an apparatus for detecting and accurately indicating the balance of a rotating body as it is attached to a machine tool.

Another object of the present invention is to provide an apparatus for detecting and indicating the balance of a rotating body in a machine tool, the apparatus having a detector and indicator device associated with the machine tool for allowing the operator to monitor the balance condition of the rotating body at all times.

Still another object of the present invention is to provide an apparatus for detecting and indicating the balance of a rotating body in a machine tool, the apparatus having a means for enabling the operator to confirm the balance condition of the rotating body at a glance.

A still other object of the present invention is to provide an apparatus for detecting and indicating the balance of a rotating body in a machine tool by selecting only the vibration of the rotating body from the vibration of the overall machine tool for detecting the amount of an off-center deviation of the rotating body dependent on the r.p.m. thereof.

A still further object of the present invention is to provide an apparatus for detecting and indicating the balance of a rotating body in a machine tool by automatically selecting only the vibration of the rotating body from the various vibrations of the machine tool for detecting the amount of an off-center deviation of the rotating body dependent on the r.p.m. thereof.

Still another object of the present invention is to provide an apparatus for detecting and indicating the balance of a rotating body in a machine tool by selectively detecting and indicating the overall vibration of the machine tool and the vibration of the rotating body such as a spindle.

A still other object of the present invention is to provide an apparatus for detecting and indicating the balance of a rotating body in a machine tool, the apparatus having a means for correcting an indicated unbalanced position of the rotating body into an actual unbalanced position thereof based on a phase variation when the indicated and actual unbalanced positions are not in exact conformity with each other.

The above objects can be achieved by an apparatus for detecting and indicating the balance of a rotating body in a machine tool, the apparatus having an original detecting means for detecting the original position of the rotating body, a vibration detecting means for detecting the vibration of the rotating body arising from an unbalanced condition thereof, an arithmetic means for computing, based on the detected vibration, off-center deviations of the rotating body in respective index positions with the original position serving as a reference position therefor, and an unbalanced position indicating means for indicating the index positions based on the computed off-center deviations.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A first embodiment of the present invention will be described with reference to FIGS. 1a through 7.

Figure 2A:
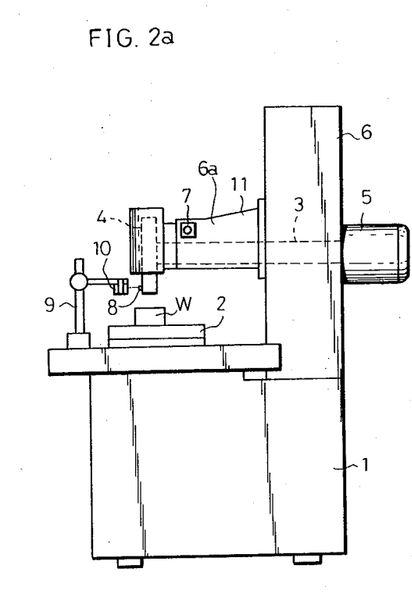
FIG. 2a is a side elevational view of a surface grinder.
Figure 2B:
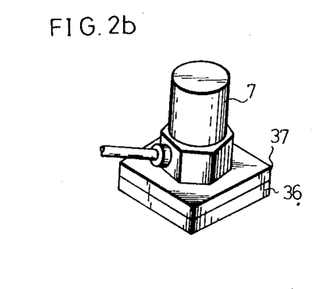
FIG. 2b is a perspective view of a vibration detector.

A surface grinder in which a balance detecting and indicating apparatus of the first embodiment is incorporated will first be described briefly with reference to FIGS. 2a and 2b. A table 2 for holding a workpiece W is movably mounted on a frame 1. A spindle 3 is rotatably supported over the table 2, and a grinding wheel 4 is attached to an end of the spindle 3 in confronting relation to the workpiece W. A motor 5 for driving the spindle 3 is connected to the other end of the spindle 3.

A grinding wheel head 6a is vertically movably attached in a cantilevered fashion to a column 6 of the frame 1. On the distal end of the grinding wheel head 6a, there is detachably mounted a piezoelectric acceleration pickup 7 (FIG. 2b) serving as a vibration detecting means. To the bottom of the piezoelectric acceleration pickup 7, there is fixed a spacer 37 in the form of an iron or aluminum plate. A magnet 36 is secured to the bottom of the spacer 37. The acceleration pickup 7 is therefore magnetically attracted to the grinding wheel head 6a by the magnet 36. The spacer 37 may be dispensed with. The acceleration pickup 7 may be bolted to the grinding wheel head 6a, rather than magnetically attracted thereto by the magnet 36. The frame 1 includes all of those parts except those which are rotated by the motor 5. The acceleration pickup 7 may be located anywhere on the frame 1 insofar as it can detect vibration of the spindle 3 or the magnet 4.

The deviation or displacement of the frame 1 is produced by the overall vibration of the surface grinder, which is the sum of various vibrations of the movable components of the surface grinder, i.e., the table 2, the spindle 3, the grinding wheel 4, the motor 5, and the like.

A light reflecting body 8 serving as a piece to be detected is attached to the front face of the grinding wheel 4 for rotation therewith. An original-point detecting sensor 10 serving as an original-point detecting means is supported by a stand 9 in a position confronting the area or plane in which the light reflecting body 8 rotates. The original-point detecting means may be constructed differently. For example, the light reflecting body 8 may be dispensed with, and a piece to be detected may project from the spindle 3 for rotation therewith, and a photosensor may be positioned as an original-point detecting means on the frame 1 in confronting relation to the piece to be detected.

Figure 3:
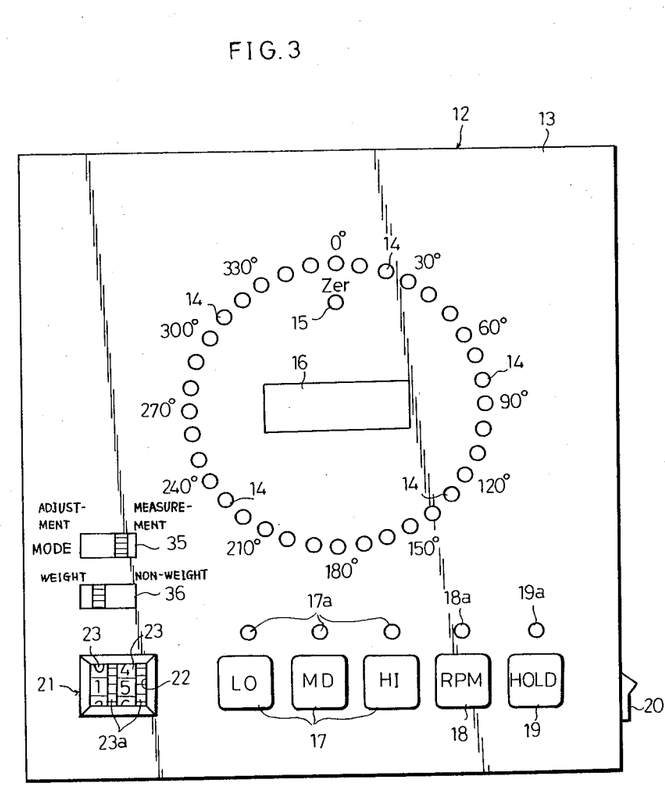
FIG. 3 is a front elevational view of a balance detecting and indicating apparatus according to a first embodiment of the present invention.

The balance detecting and indicating apparatus coupled to the surface grinder of the above construction will be described below. As shown in FIG. 3, an indicating device 12 has a front surface serving as an indicating section 13 on which a total of 36 index-position indicators 14 are arranged in an annular pattern and angularly spaced at 10-degree intervals. An original-point indicator 15 is positioned in radially confronting relation to the 0-degree index-position indicator 14. A numerical display 16 is positioned centrally on the indicating section 13 for numerically displaying the off-center deviation of the grinding wheel 4 and the r.p.m. of the spindle 3, each numeral being displayed by a 7-segment LED or liquid crystal assembly.

On the lower end of the indicating section 13, there are disposed three low-, medium-, and high-gain setting switches 17 for setting the amplification degrees of a signal detected by the acceleration pickup 7, a changeover switch 18 for displaying the r.p.m. of the spindle 3 on the numerical display 16, and a hold switch 19 for holding the display on the numerical display 16 and the indication on the index-position indicators 14. Indicators 17a, 18a, 19a are located respectively above the switches 17, 18, 19 for confirming the operation of the switches 17, 18, 19.

A position controller 21 is disposed as a correcting means on one side of the lower end of the indicating section 13. The position controller 21 has a pair of numerical rings 23 exposed through a window 22, each numerical ring 23 having an integral operating portion 23a of a roughened surface for rotating the numerical ring 23. Above the position controller 21, there are positioned a mode selector switch 35 for selecting one, at a time, of an adjustment mode including correction of the indicated position on the index-position indicators 14 and a balance measurement mode, and a condition setting switch 36 for setting a condition indicative of whether an unbalance-generating weight is attached or not in the adjustment mode. Based on the indicated-position correcting data in the adjustment mode, the numerical rings 23 of the position controller 21 are turned through appropriate intervals for correcting the indicated position on the index-position indicators 14 in increments of 10 degrees. Denoted at 20 in FIG. 3 is a power supply switch.

Figures 4, 9:
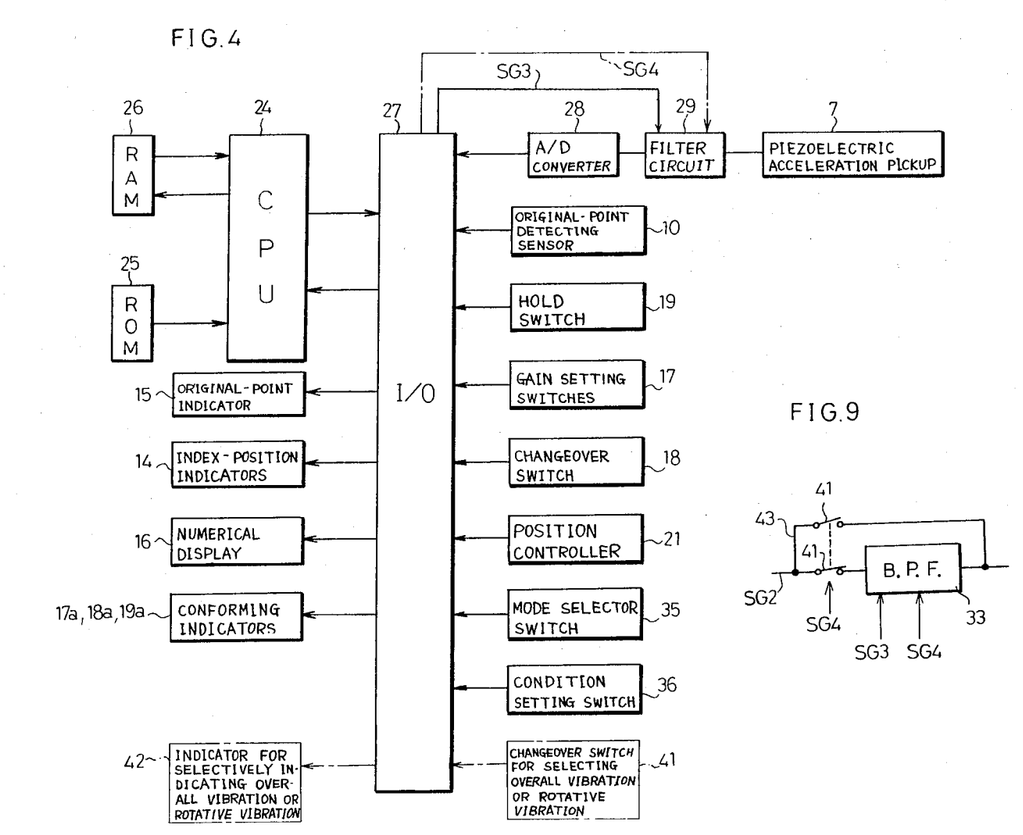
FIG. 4 is a block diagram of an electric circuit of the balance detecting and indicating apparatus shown in FIG. 3.
FIG. 9 is a circuit diagram of a portion of a filter circuit in the second embodiment.

An electric circuit of the balance indicating apparatus according to this embodiment will be described with reference to FIG. 4. To a central processing unit (CPU) 24 including an arithmetic means, a selecting means, and a control means, there are connected a read-only memory (ROM) 25 for storing a program which controls the operation of the overall apparatus, and a random-access memory (RAM) 26 having a data area for storing data. The CPU 24 is connected to an input/output interface 27 having input terminals to which there are coupled the piezoelectric acceleration pickup 7 through an A/D converter 28 and a filter circuit 29, the original-point detecting sensor 10, the hold switch 19, the gain setting switches 17, the changeover switch 18, the position controller 21, the mode selector switch 35, and the condition setting switch 36. The input/output interface 27 has output terminals connected to the index-position indicators 14, the original-point indicator 15, the numerical display 16, and the confirming indicators 17a, 18a, 19a. When the changeover switch 18 is operated, the CPU 24 detects the r.p.m. of the spindle 3 and the grinding wheel 4 based on the interval of original-point pulses issued from the original-point detecting sensor 10 and enables to display the detected r.p.m. on the numerical display 16.

Figure 5:
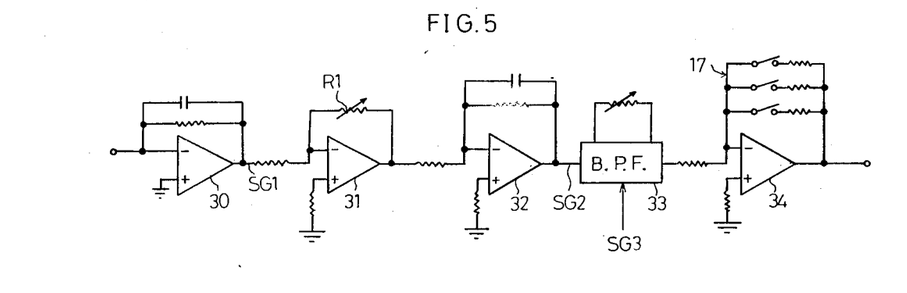
FIG. 5 is a circuit diagram of a filter circuit.

The filter circuit 29 serves to detect the vibration of the grinding wheel head 6a through the acceleration pickup 7 and detects only the vibration of the spindle 3 and the grinding wheel 4 from the detected vibration of the grinding wheel head 6a. As shown in FIG. 5, the filter circuit 29 is composed of a charge amplifier circuit 30 for converting the charge of the acceleration pickup 7 to the voltage of an acceleration signal SG1, a voltage amplifier circuit 31 for adjusting the vibration sensitivity with a rheostat R1, an integrating circuit 32 for converting the acceleration signal SG1 to a speed signal SG2, a bandpass filter (B.P.F.) 33 for selecting a required signal, and a gain switching amplifier circuit 34 for switching an amplification degree for the speed signal SG2 based on the operation of the gain setting switch 17. The bandpass filter 33 is supplied with an adjustment signal SG3 from the CPU 24 via the input/output interface 27 for bringing the central frequency of the filter 33 into conformity with the frequency corresponding to the r.p.m. of the spindle 3 as detected by coaction of the original-point sensor 10 and the CPU 24.

Figure 6:
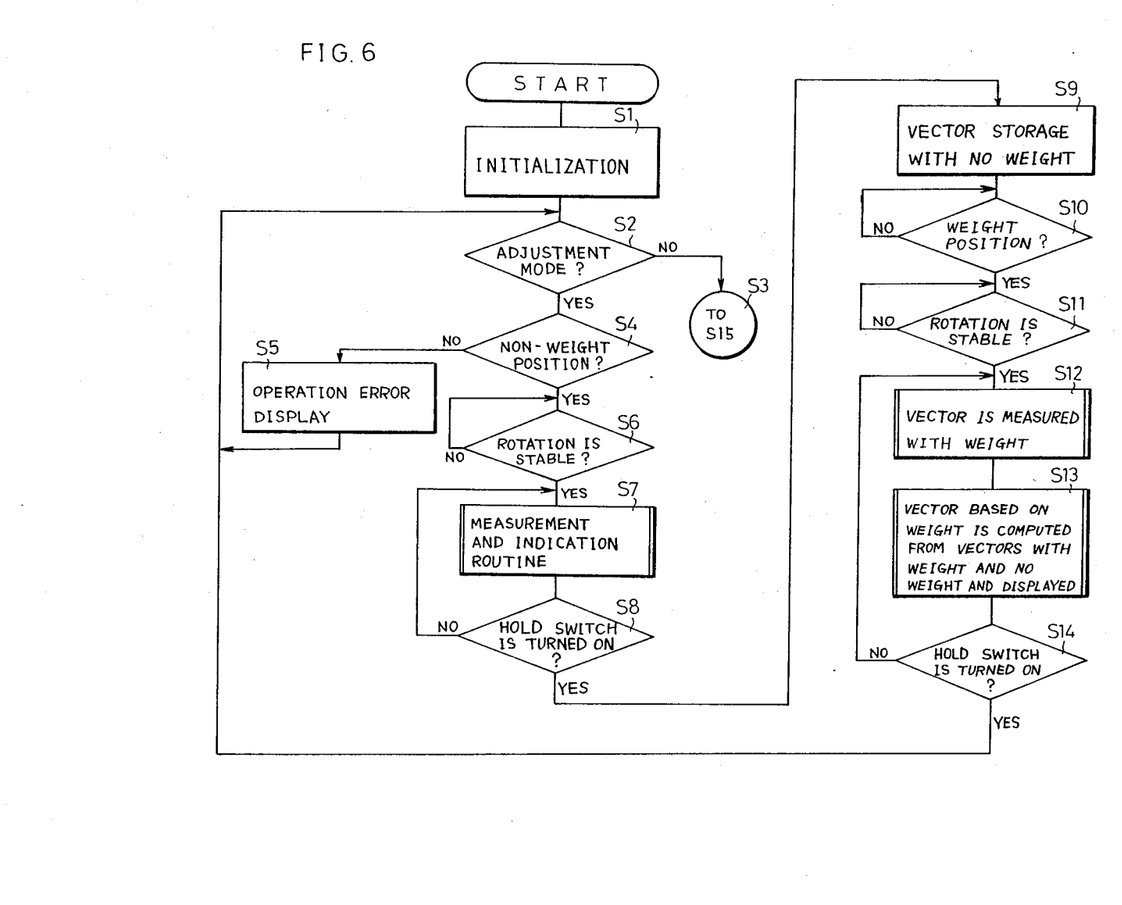
FIGS. 6 and 7 are a flowchart of operation of the balance detecting and indicating apparatus.
Figure 7:
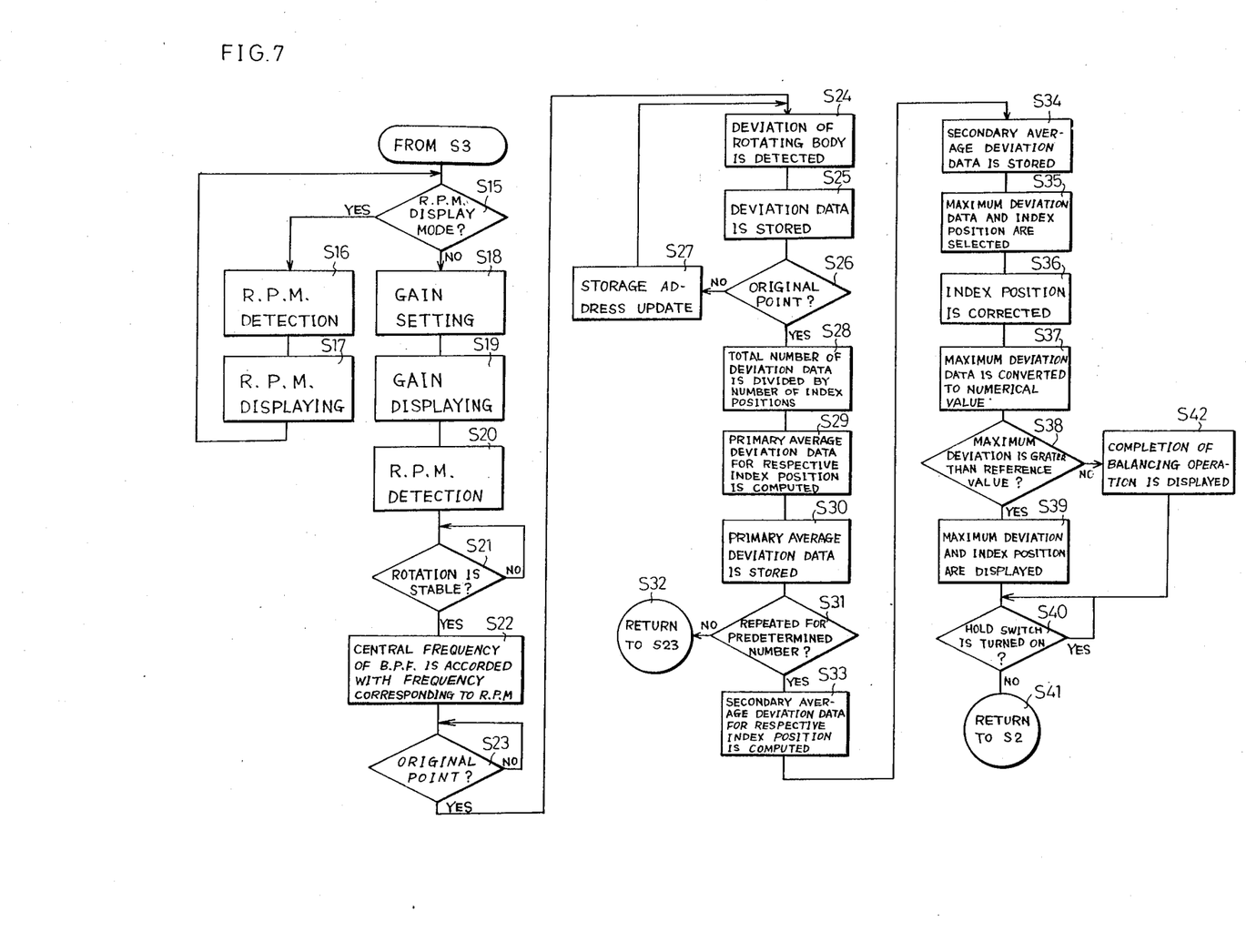

Operation of the balance indicating apparatus thus constructed will be described below. FIGS. 6 and 7 are a flowchart of the program executed by the CPU 24.

As shown in FIG. 6, when the power supply switch 20 of the indicating device 12 is turned on, initialization is effected in a step S1 and then a step S2 ascertains whether the adjustment mode is selected by the mode selector switch 35. If the adjustment mode is not set, then the program goes through a step S3 to a step S15 (FIG. 7) for balance measurement and indication.

If the adjustment mode is selected in the step S2, then the program proceeds to a step S4 which determines how the condition setting switch 36 is operated. Assuming that the spindle 3 is to be rotated with no weight attached to the grinding wheel 4 according to the procedure, and if the condition setting switch 36 is shifted to a weight position, then an operation error is displayed on the numerical display 16 in a step S5. If the condition setting switch 36 is properly shifted to a non-weight position, then control goes to a step S6 which ascertains whether the rotation of the spindle 3 and the grinding wheel 4 is stable or not by measuring and comparing the intervals of original-point detecting pulses issued from the original-point detecting sensor 10. If the rotation of the spindle 3 and the grinding wheel 4 becomes stable, then the program enters a measurement and indication routine in a step S7 in which the step S15 and following steps are executed as described later on with respect to FIG. 7. In the measurement and indication routine, the maximum value of an unbalanced condition of the spindle 3 and the grinding wheel 4 and the position thereof arising from the unbalanced condition are detected on the basis of the vibration produced by the rotation of these rotating bodies 3, 4 with no weight attached, and the maximum unbalanced value is displayed on the numerical display 16 while at the same time the index-position indicator 14 corresponding to the unbalanced position is intermittently energized or flickers.

After the display and indication have been stabilized, the operator turns on the hold switch 19, which is confirmed by a step S8, and the displayed and indicated data are held. In a step S9, the amount and position of the unbalanced condition with no weight attached, i.e., the vector data (→OA shown in FIG. 1b) of the unbalanced condition, are temporarily stored in the RAM 26. Under this condition, the operator tentatively stops the rotation of the spindle 3 and the grinding wheel 4, and a reference weight is attached to the grinding wheel 4 at an angular position (at θO° in FIG. 1b) from the original point. Then, the operator shifts the condition setting switch 36 to the weight position, and starts rotating the spindle 3 again.

Thereafter, a step 11 confirms that the spindle 3 and the grinding wheel 4 are stablized in their rotation. The program goes to a step 12 in which the vector (→OB in FIG. 1b) of an unbalanced condition of the rotating bodies 3, 4 with the weight attached is measured and indicated as in the step S7. In a following step S13, the vector (→OC in FIG. 1b) of the unbalanced condition with the weight attached is computed from the vector data with the weight attached and the vector data with no weight attached, and the computed vector is displayed on the numerical display 16 while the index-position indicator 14 corresponding to the angular position (at θC° in FIG. 1b) of the vector is intermittently energized. Then, when the turning-on of the hold switch 19 is confirmed in a step S14, the displayed and indicated data are held. The program now returns to the step S2, thus completing the process in the adjustment mode.

Therefore, by subtracting the position (θ0°) where the weight is attached from the position (θC°) of the intermittently energized index-position indicator 14, the operator can recognize the position difference as a phase variation between the indicated unbalanced position and the actual unbalanced position. The numerical ring 23 of the position controller 21 should then be turned for an angular interval corresponding to the phase variation to eliminate the phase deviation on the indicator device 12 in the subsequent balance measuring operation so that the unbalanced position indicated by the index-position indicator 14 will be brought into exact conformity with the actual unbalanced position. This results in an indication which is easier for the operator to look at for allowing the operator to balance the grinding wheel easily.

The measurement mode will be described with reference to FIG. 7.

After the indicated position has been corrected, and when the measurement mode is selected by the mode selector switch 35, the program goes from the NO side of the step S2 to the step S15 which confirms the operation of the changeover switch 18. If an r.p.m. display mode is selected by the changeover switch 18, then a step S16 detects the r.p.m. of the spindle 3 based on the intervals of original-point detecting pulses generated by the original-point detecting sensor 10. After the detected r.p.m. is displayed on the numerical display 16 in a step S17, control goes back to the step S15.

If the changeover switch 18 is not actuated and hence a deviation indicating mode is established in the step S15, then one of the high-, medium-, and low-gain setting switches 17 is turned on to select an amplification degree for the signal issued by the acceleration pickup 7, and the confirming indicator 17a corresponding to the actuated gain setting switch 17 is energized in a step S19.

A step S20 detects the r.p.m. of the spindle 3 and the grinding wheel 4 by measuring the intervals of the original-point detecting pulses from the original-point detecting sensor 10. A step S21 compares the measured intervals of the original-point detecting pulses to ascertain whether the rotation of the spindle 3 and the grinding wheel 4 is stable or not.

In a step 22, the central frequency of the bandpass filter 33 of the filter circuit 29 is brought into conformity with the frequency corresponding to the r.p.m. of the spindle 3 as detected in the step S20.

If the original point on the grinding wheel 4 is detected by the original-point detecting sensor 10 in a step S23, then data items which can be processed by the A/D converter 28 in one revolution of the grinding wheel 4, or 36 deviations that are as many as the number of the index-position indicators 14, are detected, and the detected data items are stored in the RAM 26 in steps S24 through S27. If the original point is detected in the step S26, then the program proceeds to a step S28 in which the total number of the detected deviation data items is divided by the number of the index positions which are spaced 10°, or 36. Thereafter, the deviation data items for the respective index positions are totaled in a step S29, and the sum is divided by the number of data items to compute primary average deviation data. The computed primary average deviation data for the index positions is then stored in the data area of the RAM 26 in a step S30.

A step S31 then ascertains whether the detection of the deviation data and the storage thereof are repeated for a predetermined number of times. If not repeated, then the program returns through a step S32 to the step S23, and if repeated, then the program goes to a step S33 in which the primary average deviation data for each revolution is read out of the RAM 26, the read data items are totaled, and the sum is divided by the predetermined number to produce secondary average deviation data. The computed secondary average deviation data is then stored in the RAM 26 for each index position in a step S34.

A step S35 selects the maximum deviation data and the index position where the maximum deviation data is produced by comparing the secondary average data items. In a step S36, the index position where the maximum deviation data is produced is corrected on the basis of the data corrected by operation of the position controller 21. In a step S37, the maximum deviation data is converted to a numerical value that can be displayed on the numerical display 16. A step S38 determines whether the maximum deviation is greater than a reference value or not. If the maximum deviation is greater than the reference value, the program goes to a step S39 in which the maximum deviation is displayed on the deviation display 16 and the index-position indicator 14 corresponding to the position where the corrected maximum deviation is generated and is intermittently energized. At this time, other indicators 14 adjacent to the indicator 14 corresponding to the position where the maximum deviation is produced are also energized. Since the central indicator 14 flickers while the adjacent indicators 14 are continuously energized, the position where the maximum deviation occurs can easily be confirmed.

Then, if the hold switch 19 is detected as being turned on in a step S40, then the displayed and indicated data is held, and the holding condition is indicated by the confirming indicator 19a which is energized. If the hold switch 19 is not turned on, then the program returns through a step S41 to the step S2 for repeating the aforesaid steps.

If the maximum deviation is not greater than the reference value in the step S38, i.e., if the spindle 3 and the grinding wheel 4 is judged as being balanced, then control goes to a step S42 in which the letters "GOOD" indicating the completion of the balancing operation are displayed on the numerical display 16. Thereafter, the program goes to the step S40.

The numerical convertion in the step S37 can be effected by converting the data computed in the preceding step to relative values based on m·r (mass × radius), acceleration, speed, displacement, or reference deviation.

Figure 1A:
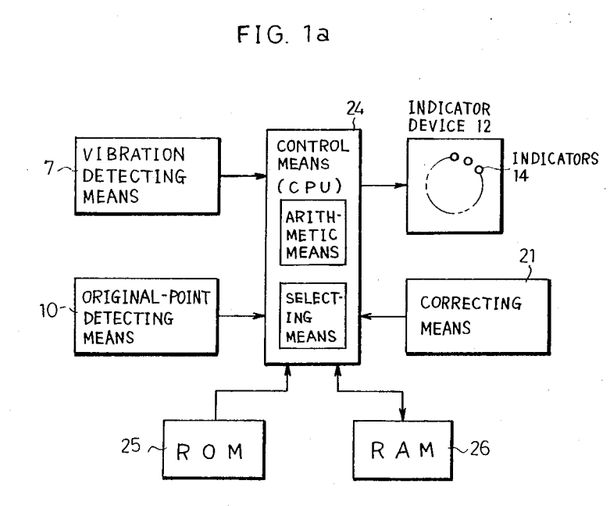
FIG. 1a is a block diagram of an apparatus according to the present invention.
Figure 1B:
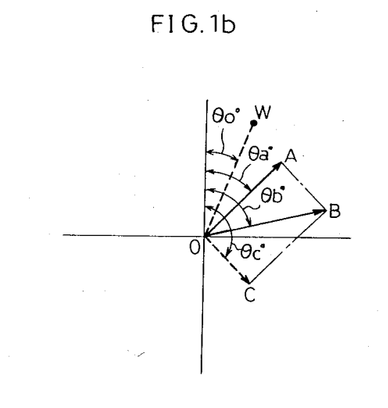
FIG. 1b is a diagram showing the principles of operation of the apparatus.

According to the balance indicating apparatus of the foregoing embodiment, the vector →OC in FIG. 1b represents not only the indicated position due to the weight having a weight W, but also the deviation as indicated of the weight. Therefore, by determining the ratio of the deviation and the actual weight W, the deviation of the rotating body can be converted to a weight based on the determined ratio. Consequently, the unbalance of the rotating body can easily be eliminated by attaching the weight or balancing piece having the converted weight to the angular position of the rotating body, which corresponds to the indicated index-position indicator 14.

As shown in FIG. 3, the angles of the index-position indicators 14 on the indicator device 12 are progressively increased clockwise. However, the direction of rotation of the spindle in the grinding machine varies from type to type. To cope with this, a direction changeover switch may be disposed on the indicator device 12, and may be selectively operated dependent on the direction of rotation of the rotating body to allow data to be collected under the same condition. Thus, the balance indicating apparatus can be used for balancing different rotating bodies which may vary in their direction of rotation.

In the foregoing first embodiment, the central frequency of the frequency selecting means is automatically adjusted by the CPU 24. However, this frequency adjustment may be manually effected through a manual control dial.

The balance indicating apparatus of the present invention may be arranged to selectively detect and indicate the overall vibration of the machine tool and the vibration of the rotating body. With such a second embodiment, a changeover switch 41 for selecting the overall vibration or the rotative vibration is disposed on the indicating section 13 and connected to an input terminal of the input/output interface 27, and an indicator 42 for selectively indicating the overall vibration or the rotative vibration is disposed on the indicating section 13 and connected to an output terminal of the input/output interface 27. As illustrated in FIG. 9, the filter circuit 29 has a circuit 43 bypassing the bandpass filter 33 with the changeover switch 41 connected in the circuit 43. The changeover switch 41 is actuated by a changeover signal SG4 generated by the CPU 24 and applied via the input/output interface 27.

Operation in the measurement mode of the balance indicating apparatus according to the second embodiment will be described with reference to FIG. 8.

Figure 8:
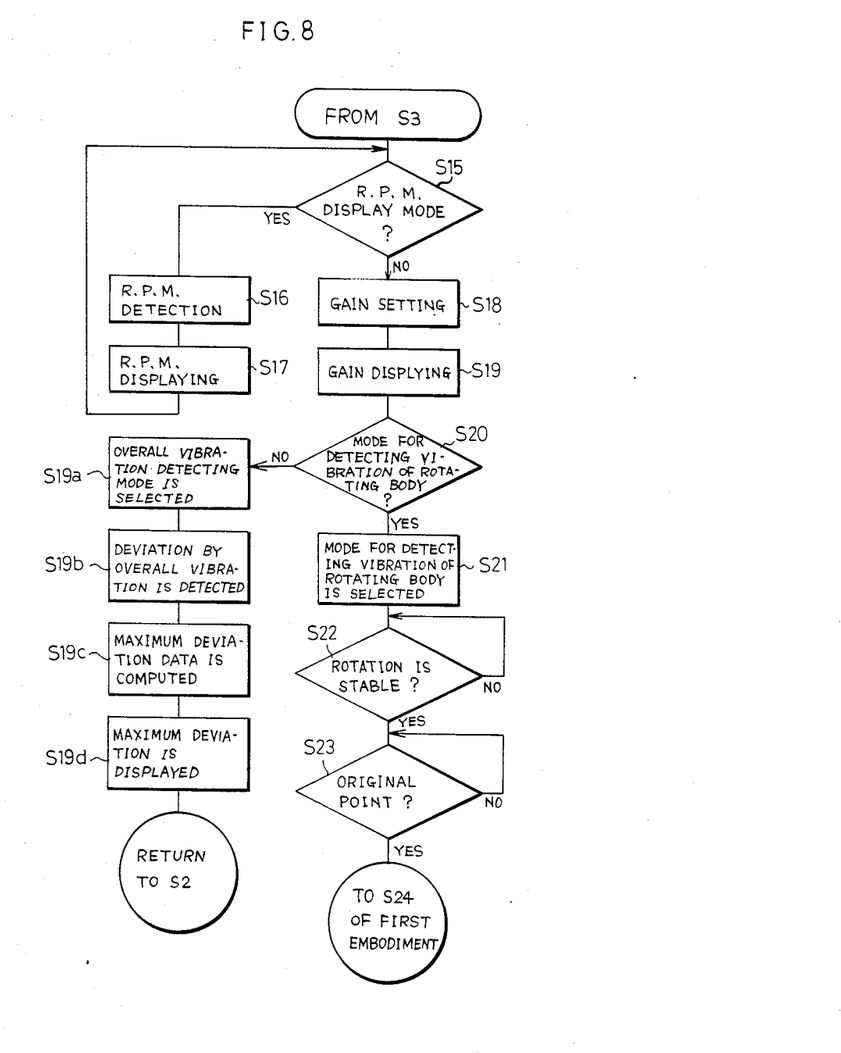
FIG. 8 is a flowchart of operation of a balance detecting and indicating apparatus according to a second embodiment of the present invention.

Steps S15 through S19 in FIG. 8 are effected in the same manner as the steps S15 through S19 in FIG. 7 for the balance indicating apparatus of the automatic adjusting type according to the preceding embodiment. A step S20 ascertains whether a mode for detecting the vibration of the rotating body is selected by the changeover switch 41. If not selected, i.e., if a mode for detecting the overall vibration is selected, then the mode for detecting the overall vibration is established in a step S19a to override the operation of the bandpass filter 33 of the filter circuit 29. Then, a pluraltiy of deviation data items produced by the overall vibration on the head 6a are detected in a step S19b based on the detected signal from the acceleration pickup 7. The maximum deviation data value amont the deviation data items is then computed in each time unit in a step S19c. Then, the computed data value is converted to a numerical value that can be displayed, and the numerical value is displayed on the numerical display 16 in a step S19d. Thereafter, the program returns to the step S2. Therefore, the overall vibration of the machine tool can correctly be confirmed to facilitate determination of any abnormal vibration.

If the decision of the step S20 results in YES, i.e., if the mode for detecting the vibration of the rotating body is selected, the mode for detecting the vibration of the rotating body is established in a step S21 to rely on the frequency selection by the bandpass filter 32. A step S22 then ascertains whether the rotation of the spindle 3 and the grinding wheel 4 is stable or not by measuring and comparing the intervals of original-point detecting pulses issued from the original-point detecting sensor 10.

If the stable rotation of the spindle 3 and the grinding wheel 4 is confirmed, then a step S23 detects the original point on the grinding wheel 4 through the original-point detecting sensor 10.

After the original point has been detected, the step S24 and following steps will be executed as in the operation of the preceding apparatus of the automatic adjusting type.

While the modes for detecting the overall vibration and the vibration of the rotating body are manually selected in the second embodiment, these modes may automatically switched on a time-sharing basis for displaying two data items at the same time. With such a modification, a display for displaying the overall vibration should be provided in addition to the display for displaying the vibration of the rotating body. Alternatively, predetermined ranges may be established for ascertaining whether the deviations due to the vibration of the rotating body and the overall vibration are acceptable or not, and the results of the vibration acceptability may be displayed on respective displays without involving mode switching.

The present invention may be modified as follows:

(1) When the display "GOOD" is given after the balancing operation is completed, the result of balancing determination (if the unbalanced condition is in the acceptable range or not) may be issued to an external circuit. The acceptable value setting may be varied.

(2) The deviation (noise level) may be measured while the rotating body of the machine tool is at rest. The noise level having the same frequency as the r.p.m. of the rotating body may be measured even when the noise level is measured by utilizing the overall vibration of the machine tool. If the measured noise level exceeds the acceptable range, then an alarm may be indicated or issued to an external circuit for ascertaining whether the rotating body can be measured for balanced condition.

(3) The deviation may be displayed on an analog display such as a meter or the like, rather than the digital display, or may be displayed on both digital and analog displays.

(4) In the balance indicating apparatus capable of automatically adjusting the central frequency, the central frequency of the filter circuit 29 may be varied by the signal from the original-point detecting sensor without involving the CPU 24 (as by a voltage obtained by frequency/voltage conversion). This alternative is advantageous in that when the r.p.m. of the rotating body varies continuously, the ability of the central frequency to follow the r.p.m. of the rotating body is increased, and the resolution of the central frequency is improved.

Although certain preferred embodiments have been shown and described, it should be understood that many changes and modifications may be made therein without departing from the scope of the appended claims.

What is claimed is:

1. An apparatus for detecting and indicating the balance of a rotating body in a machine tool, comprising:
    origin-point detecting means for detecting an origin-point on the rotating body;
    vibration detecting means for detecting vibration caused by an unbalanced condition of the rotating body;
    arithmetic means for computing, from the detected vibration, an off-center deviation of the rotating body at each of a plurality of index positions on the rotating body which are angularly spaced from the origin-point as a reference;
    unbalance position indicating means for indicating an unbalance position based on the computed off-center deviations of the rotating body;
    display means for displaying an unbalance amount based on the computed off-center deviations of the rotating body; and
    correcting means for adjusting and conforming the unbalance position indicated by the unbalance position indicating means exactly to the actual unbalance position of the rotating body,
    the arithmetic means comprising means for computing first vector data representing an unbalance position and amount on the rotating body without any weight thereon, second vector data representing an unbalance position and amount on the rotating body with a weight attached thereto at an angular position from the origin-point, and third vector data representing an unbalance position and amount produced on the rotating body by the weight on the basis of both the first and second vectors; the adjustment by the correcting means being performed on the basis of the three vectors.

2. An apparatus according to claim 1, further comprising mode selecting means for selecting one of an adjustment mode in which an adjustment of the unbalance position indicated by the unbalance position indicating means is performed, and an unbalance measurement mode in which a measurement of the unbalance position and amount is performed 3. An apparatus according to claim 2, further comprising condition setting means for setting, in the adjustment mode, one of a first condition in which no weight is attached to the rotating body and a second condition in which the weight is attached to the rotating body, the arithmetic means comprising means for computing the first vector data on the rotating body in the first condition, and the second vector data on the rotating body in the second condition.

4. An apparatus according to claim 3, wherein the unbalance position indicating means includes a plurality of indicators arranged in an annular pattern so as to correspond to respective index positions and means for intermittently energizing a selected one of the indicators to indicate an index position corresponding to a deviation of maximum value among deviations for the respective index positions based upon computed deviations.

5. An apparatus according to claim 4, wherein the unbalance position indicating means further includes means for continuously energizing indicators in a predetermined range of indicators adjacent the intermittently energized indicator.

6. An apparatus for detecting and indicating the balance of a rotating body in a machine tool, comprising:
    origin-point detecting means for detecting an origin-point on the rotating body;
    vibration detecting means for detecting vibration caused by an unbalanced condition of the rotating body;

arithmetic means for computing, from the detected vibration, off-center deviation data of the rotating body at each of a plurality of index positions on the rotating body which are angularly spaced from the origin-point as a reference, the arithmetic means comprising means for computing as many deviation data as are able to be processed in one revolution of the rotating body from the origin-point and storing them in memory means connected to the arithmetic means, dividing the total number of the deviation data by the number of the index positions, totaling the magnitudes of the deviation data for the index positions, and dividing the total of said deviation magnitudes at said index positions by the number of deviation data for the index positions, thereby computing a primary average deviation data and storing said primary average deviation data in the memory means, the arithmetic means comprising means for totaling the primary average deviation data for the index positions in a predetermined number of revolutions of the rotating body, dividing the total deviation amount of the primary deviation data by the number of revolutions, and computing a secondary average deviation data for the index positions, thereby selecting a maximum deviation data and an index position where the maximum deviation is produced by comparing the secondary average deviation data for the index positions;

unbalanced position indicating means for indicating the index position where the maximum deviation is produced; and display means for displaying a value corresponding to the maximum deviation.

7. An apparatus according to claim 6, further comprising correcting means for adjusting and conforming the index position indicated by the unbalanced position indicating means exactly to an actual unbalanced position of the rotating body; mode selecting means for selecting one of an adjustment mode in which an adjustment of the index position indicated by the unbalanced position indicating means is performed, and an unbalance measurement mode in which a measurement of an unbalanced position and amount is performed; the arithmetic means comprising means, in the adjustment mode, for computing first vector data representing an unbalanced position and amount on the rotating body without any weight thereon, second vector data representing an unbalanced position and amount on the rotating body with a weight attached thereto at an angular position from the original point, and third vector data representing an unbalanced position and amount produced on the rotating body by the weight on the basis of both the first and second vectors, the adjustment by the correcting means being performed on the basis of the three vectors.

8. An apparatus according to claim 6, wherein the unbalanced position indicating means includes a plurality of indicators arranged in an annular pattern so as to correspond to respective index positions, and means for intermittently energizing a selected one of the indicators to indicate the index position where the maximum deviation is produced.

9. An apparatus according to claim 6, wherein the unbalanced position indicating means further includes means for continuously energizing indicators in a predetermined range of indicators adjacent the intermittently energized indicator.

10. An apparatus according to claim 6, further comprising selecting means for selecting a signal corresponding to a vibration of the rotating body among signals of vibrations detected by the vibration detecting means, the selecting means including gain setting means for setting an amplification degree of the signal detected by the vibration detecting means.

11. An apparatus according to claim 6, wherein the vibration detecting means includes a piezoelectric acceleration pickup detachably attached to a desired position of a frame of the machine tool.

12. An apparatus according to claim 6, further comprising hold means for holding a display condition of the unbalanced position indicating means and the display means.

13. An apparatus according to claim 6, further comprising changeover means for selectively displaying either the value corresponding to the maximum deviation or an r.p.m. of the rotating body.

* * * * *